US012413008B2

(12) United States Patent
DeWitte et al.

(10) Patent No.: US 12,413,008 B2
(45) Date of Patent: Sep. 9, 2025

(54) TEMPORARY HEADER RETENTION FEATURE

(71) Applicant: TE Connectivity Services GmbH, Schaffhausen (CH)

(72) Inventors: Thomas Robert DeWitte, Troy, MI (US); David James Rhein, Troy, MI (US); Pushkar S. Kolhatkar, Troy, MI (US)

(73) Assignee: TE Connectivity Solutions GmbH (CH)

( * ) Notice: Subject to any disclaimer, the term of this patent is extended or adjusted under 35 U.S.C. 154(b) by 783 days.

(21) Appl. No.: 17/712,886

(22) Filed: Apr. 4, 2022

(65) Prior Publication Data

US 2022/0329000 A1 Oct. 13, 2022

Related U.S. Application Data

(60) Provisional application No. 63/173,608, filed on Apr. 12, 2021.

(51) Int. Cl.

| | |
|---|---|
| ***H01R 13/516*** | (2006.01) |
| ***H01R 13/502*** | (2006.01) |
| ***H01R 13/631*** | (2006.01) |
| ***H01R 13/639*** | (2006.01) |
| ***H01R 13/74*** | (2006.01) |

(52) U.S. Cl.
CPC ......... *H01R 13/516* (2013.01); *H01R 13/502* (2013.01); *H01R 13/631* (2013.01); *H01R 13/639* (2013.01); *H01R 13/743* (2013.01)

(58) Field of Classification Search
CPC .... H01R 13/74; H01R 13/741; H01R 13/743; H01R 13/745
See application file for complete search history.

(56) References Cited

U.S. PATENT DOCUMENTS

| | | | | |
|---|---|---|---|---|
| 1,483,218 A * | 2/1924 | Fahnestock | H02G 3/083 | 403/197 |
| 2,167,270 A * | 7/1939 | Woodward | H01R 33/465 | 439/558 |
| 3,424,414 A * | 1/1969 | Horwitt | F23Q 7/00 | 219/265 |
| 5,238,427 A * | 8/1993 | Fry | H01R 13/745 | 248/231.9 |
| 5,435,749 A * | 7/1995 | Kawase | H01R 13/741 | 439/557 |
| 6,589,076 B1 * | 7/2003 | Davis | H01R 13/741 | 439/939 |

(Continued)

*Primary Examiner* — Neil Abrams

(57) ABSTRACT

An electrical header for mounting to an object such as an electrical device. The header comprises a body including a base, a first plug end defined on a first side of the base and adapted to mate with a mating connector, and a second plug end defined on a second side of the base and adapted to be inserted into the object. An elastic locking element is arranged on the second plug end and is adapted to engage with and secure the header to the object. The elastic locking element is sized and shaped to be elastically biased by the object in a direction transverse to an insertion direction of the header during removal of the header from the object. The elastic element may be formed to be integral with a shield of the header.

20 Claims, 3 Drawing Sheets

(56) References Cited

U.S. PATENT DOCUMENTS

| | | | | |
|---|---|---|---|---|
| 6,752,642 | B2 * | 6/2004 | Ushiro | H01R 13/743<br>439/549 |
| 7,045,714 | B1 * | 5/2006 | Kiely | H01R 13/745<br>174/666 |
| 2022/0329000 | A1 * | 10/2022 | DeWitte | H01R 13/743 |

* cited by examiner

TEMPORARY HEADER RETENTION FEATURE

CROSS-REFERENCE TO RELATED APPLICATIONS

This application claims priority to U.S. Provisional Application No. 63/173,608, filed on Apr. 12, 2021, the entire disclosure of which is incorporated by reference herein.

FIELD OF THE INVENTION

The present disclosure relates to electrical connectors, and more particularly, to an electrical header for mounting to an object such as an electrical device.

BACKGROUND

Electronic components are often housed or packaged separately from a remainder of a larger electrical system in which they are utilized, promoting ease of integration and improved protection of sensitive components from harsh environmental conditions. As a result, the components must be electrically interconnected with other elements of the system. These connections are typically implemented via wires or cables joining various components using complementary electrical connectors, including device-mounted headers. Currently, headers are mounted to a surface (e.g., a housing of an electrical device associated with the header) via one or more fasteners.

In order to position and retain the header on the device prior to fastening, the header or the device may include a positive locking feature, such as a latch, engaging with a wall of the device. The locking feature must be released in order to remove the header from the device, such as for repair or replacement. Generally, this requires either access to the interior of the device, or the performance a manual, external prying operation which may result in damage to the device and/or the header.

Accordingly, improved systems for mechanically retaining an electrical connector or header to a device are desired.

SUMMARY

In one embodiment of the present disclosure an electrical connector or header for mounting to an object such as an electrical device is provided. The header comprises a body including a base. A first plug end is defined on a first side of the base and is adapted to mate with a mating connector. A second plug end is defined on a second side of the base and is adapted to be inserted into the object to which the header is mounted. An elastic locking element is arranged on the second plug end and is adapted to engage with and secure the header to the object.

BRIEF DESCRIPTION OF THE DRAWINGS

The invention will now be described by way of example with reference to the accompanying Figures, of which.

DETAILED DESCRIPTION OF THE EMBODIMENTS

Figure 1:
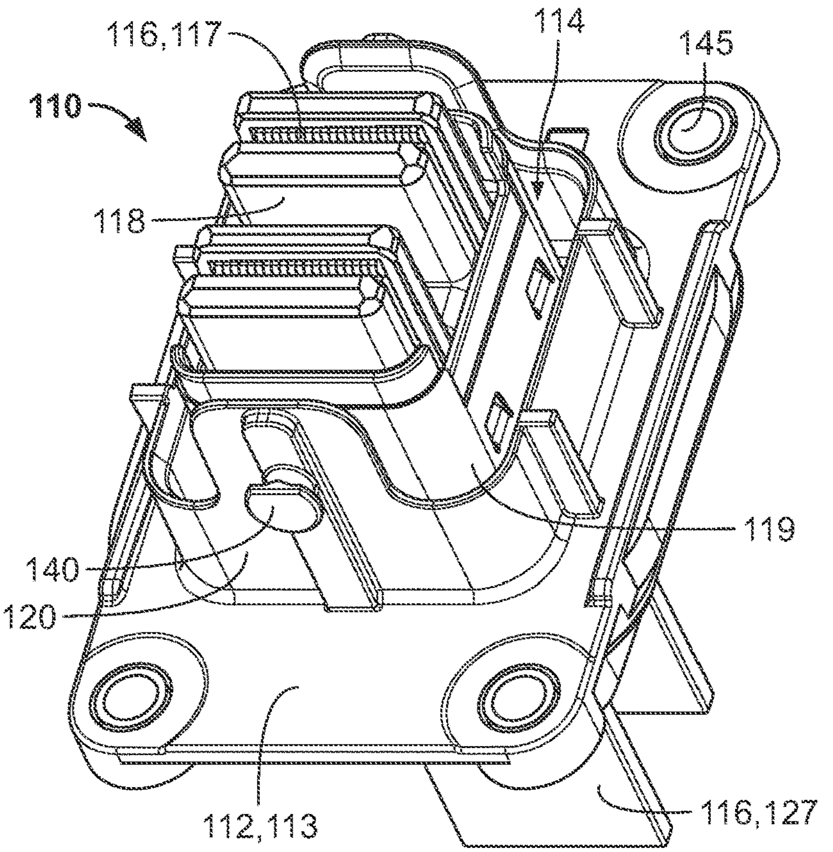
FIG. 1 is top perspective view of an electrical connector or header useful for describing embodiments of the present disclosure.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Embodiments of the present disclosure include an electrical header mountable to an object, such as a housing of an electronic component. The header comprises a body defining a plug on a first end thereof adapted to mate with a corresponding (i.e., mating) connector. A second end of the body opposite the first end includes an elastic locking element adapted to engage with the object for securing the header thereto.

Referring generally to FIG. 1, an electrical connector assembly according to an embodiment of the present disclosure includes a first connector or header 110 adapted to mate with a mating connector (not shown). The header 110 includes a base 112 defining an outer mounting flange 113 generally surrounding a central opening 114 formed therethrough. A plurality of apertures 145 are formed through the base 112, and are sized to receive corresponding fasteners for securing the header 110 to a mounting surface, for example, a housing of an electrical component or device.

Figure 2:
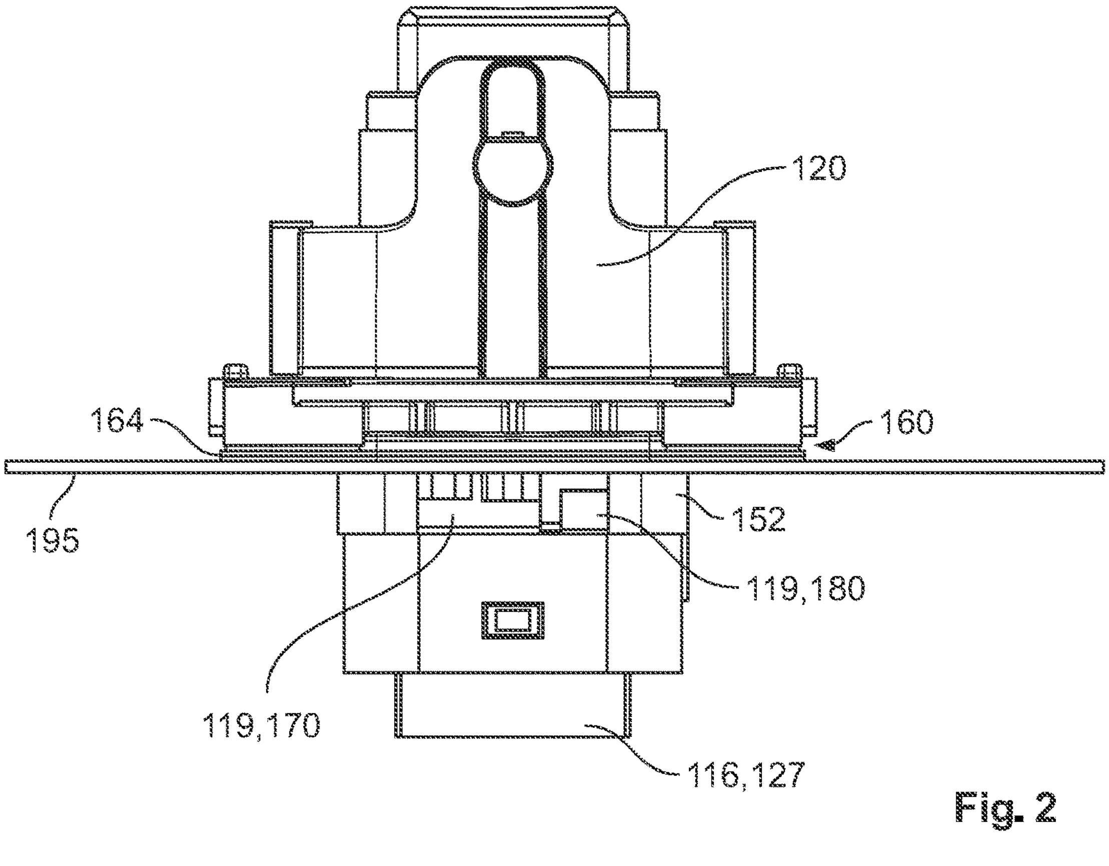
FIG. 2 is a side view of the header of FIG. 1 attached to an exemplary mounting wall or device.

FIG. 2 illustrates an exemplary mounting wall 195 of a device to which the header 110 may be attached. Electrical conductors or terminals 116 extend through the opening 114 and comprise first ends 117 for mating with corresponding conductive terminals of the mating connector, and second ends 127 for mating with a conductor of the electrical device or component, such as a bus bar arranged within a housing of the device. In the exemplary embodiment, each terminal 116 defines a conductive fork on the first end 117 thereof, and a blade on the second end 127 thereof. The terminals 116 may be provided as part of a removable and/or preassembled terminal assembly including an insulating terminal housing 118 and an outer conductive (i.e., metallic) shield 119 receiving the terminal housing and terminals. The terminal assembly is removably attachable to the header base 112 within the opening 114, via, for example, locking connection features or latches, as shown in FIG. 3.

The base 112 further defines a plug end 120 extending from a first side thereof and adapted to mate with a corresponding mating end of the mating connector. The plug end 120 may be embodied as a continuous circumferential wall surrounding the opening 114. The header 110 may comprise features for engaging with a locking lever of the mating connector for facilitating the mating and unmating of the mating connector from the header, and to lock the connectors together in the mated. Specifically, the locking lever may define an arcuate cam slot and/or channel for receiving and engaging with a corresponding one or more locking features, such as a cam follower 140 formed on the header 110.

Figure 3:
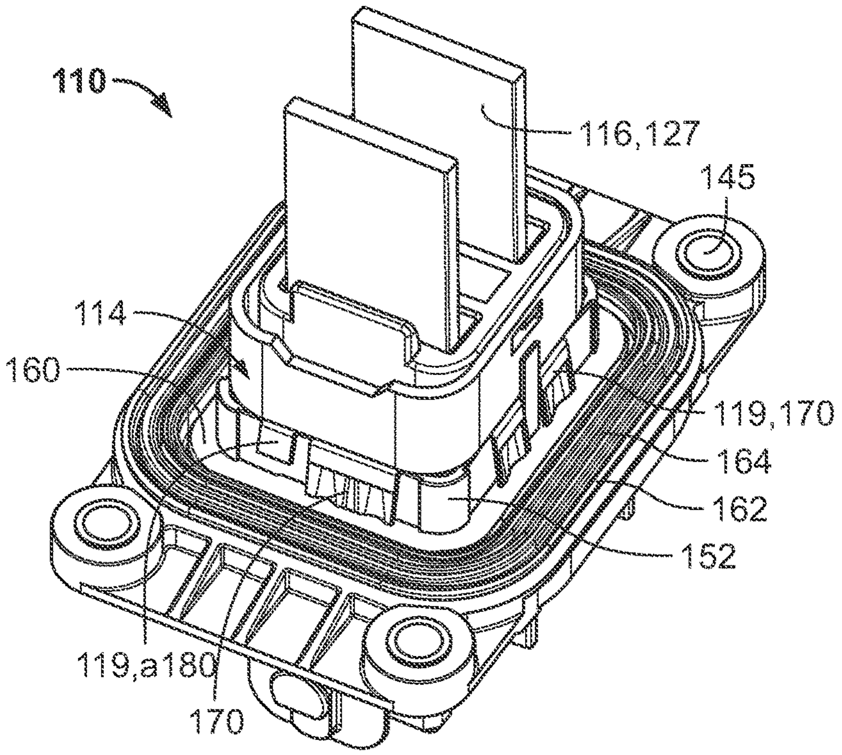
FIG. 3 is a bottom perspective view of the header of FIG. 1.

With particular reference to the side and bottom perspective views of the header 110 shown in FIGS. 2 and 3, an underside 160 of the base 112 of the header 110 defines an annular recess 162 surrounding the opening 114 for receiving a barrier seal 164 (e.g., a rubberized sealing ring). The barrier seal 164 is operative to seal the base 112 against the mounting wall 195 under compressive force applied by the fasteners received through the associated mounting apertures 145. A second plug end of the header 110 is embodied by a circumferential wall 152 extending from the underside 160 of the base 112. The circumferential wall 152 further defines the opening 114 and receives the terminal assembly. In other embodiments, the circumferential wall 152 may be replaced by one or more sidewalls which do not necessarily extend continuously about the opening 114 (e.g., at least two sidewalls arranged on opposite sides of the opening 114). As illustrated, the outer conductive shield 119 of the terminal assembly defines a plurality of contacts or contact tabs 170 into which a portion of the circumferential wall 152 may be received. Each contact tab 170 is configured to establish electrical contact (e.g., ground contact) with, for example, the mounting wall 195 through which the header 110 is mounted, as shown in FIG. 2.

The conductive shield 119 of the exemplary header 110 further comprises tabs or clips 180. More specifically, the elastic tab 180 defines a moveable free end or locking lip configured to engage with an underside of the mounting wall 195 for preventing the removal of the header 110. With the header 110 inserted through the opening in the mounting wall 195, the mounting wall may be held between the free end of the elastic tab 180 and the barrier seal 164 or underside 160 of the header, as shown in FIG. 2. As set for the above, while useful for retaining the header 110 in position on the device or mounting wall 195, this type of tab 180 can only be removed via manually deflecting the free end thereof radially inward. This operation requires access to the inside of the device.

Figure 4:
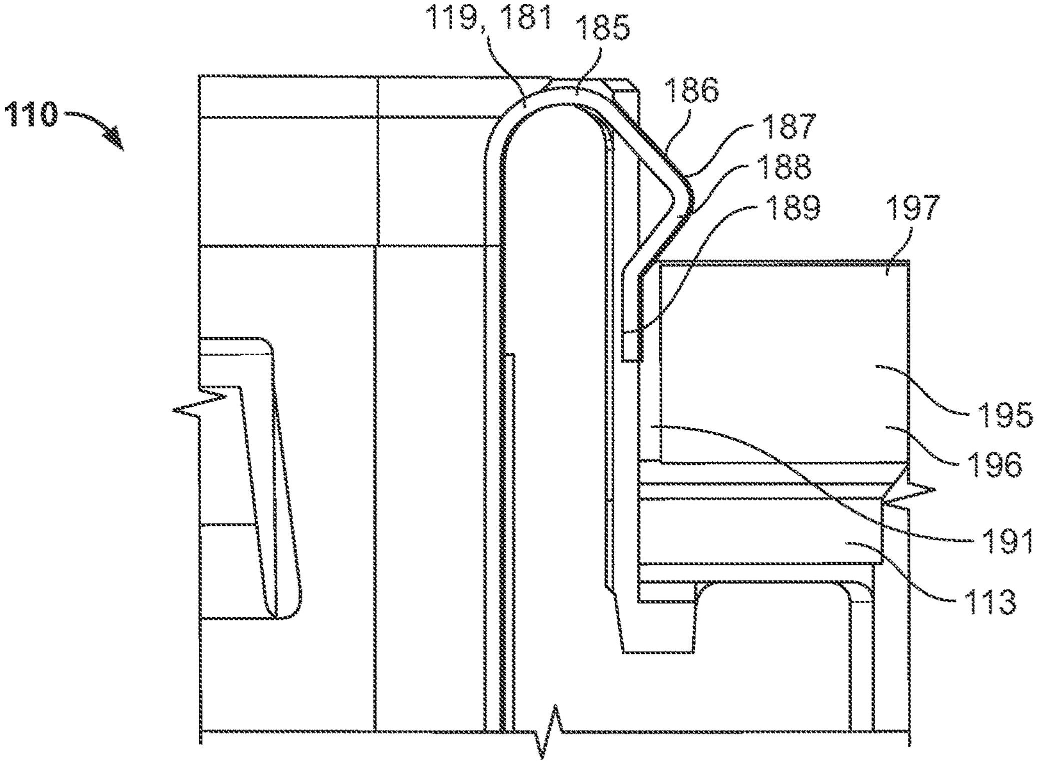
FIG. 4 is a partially cross-sectional view of the header of FIG. 1 implementing a locking feature according to an embodiment of the present disclosure.
Figure 5:
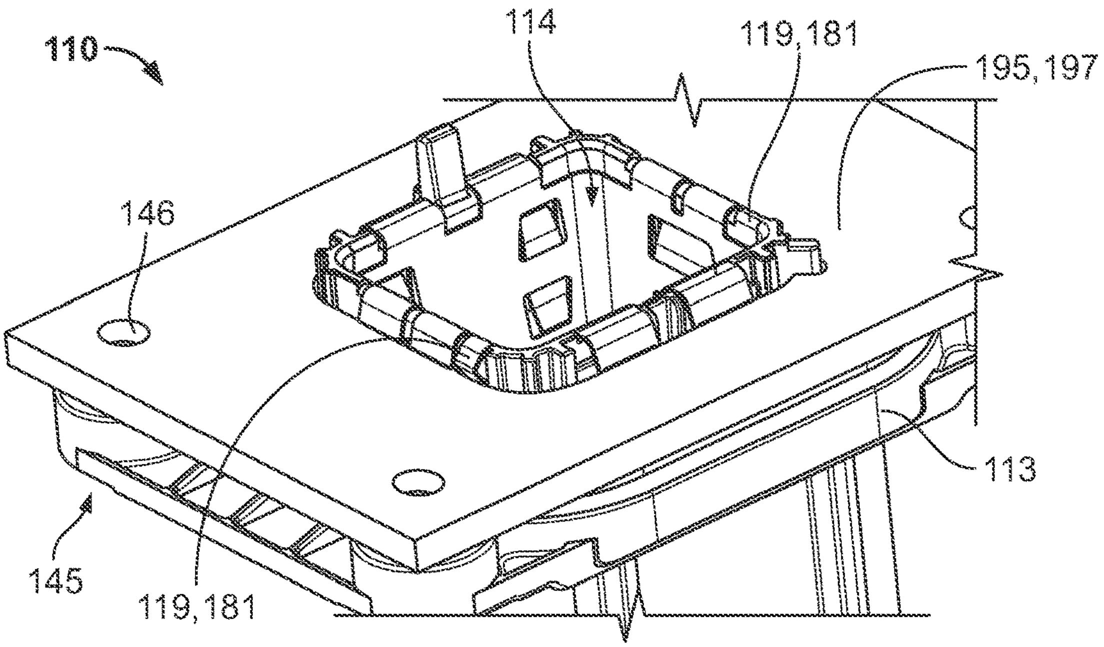
FIG. 5 is a bottom perspective view of the header of FIG. 4 in an installed position with respect to a mounting wall or device.

Embodiments of the present disclosure provide an improved retaining system which may be implemented into the header 110 shown and described in the preceding figures. Specifically, referring to FIGS. 4-6, an elastic locking element or spring is embodied as one of an elastic tab 181 or an elastic clip 182 for selectively fixing the header 110 to the device or mounting wall 195 thereof. As set forth above with respect to the elastic tab 180 shown in FIGS. 2 and 3, the elastic tab 181 may be formed integrally with the shield 119 of the header 110, as shown in FIGS. 4 and 5. Alternatively, the elastic clip 182 comprises a separate, discrete element selectively fixable to and/or over the second plug end or shield 119 of the header 110 as shown in FIG. 6.

In either embodiment, the locking element 181, 182 is operative to temporarily fix the header 110 to the mounting wall 195 prior to fastening via the illustrated mounting flange 113, mounting apertures 145 and corresponding mounting holes 146 formed in the mounting wall 195. In this way, after engaging the tabs or clips 181, 182 within an opening formed in the mounting wall 195, an installer of the header 110 may continue with the installation operation without having to hold the header in position on the device.

Further, the header 110 may be released from the mounting wall 195 or device without having to manually manipulate the locking elements 181, 182, as is required by the embodiment shown in FIGS. 2 and 3. In this way, internal access to the device is not required for releasing the header.

Figure 6:
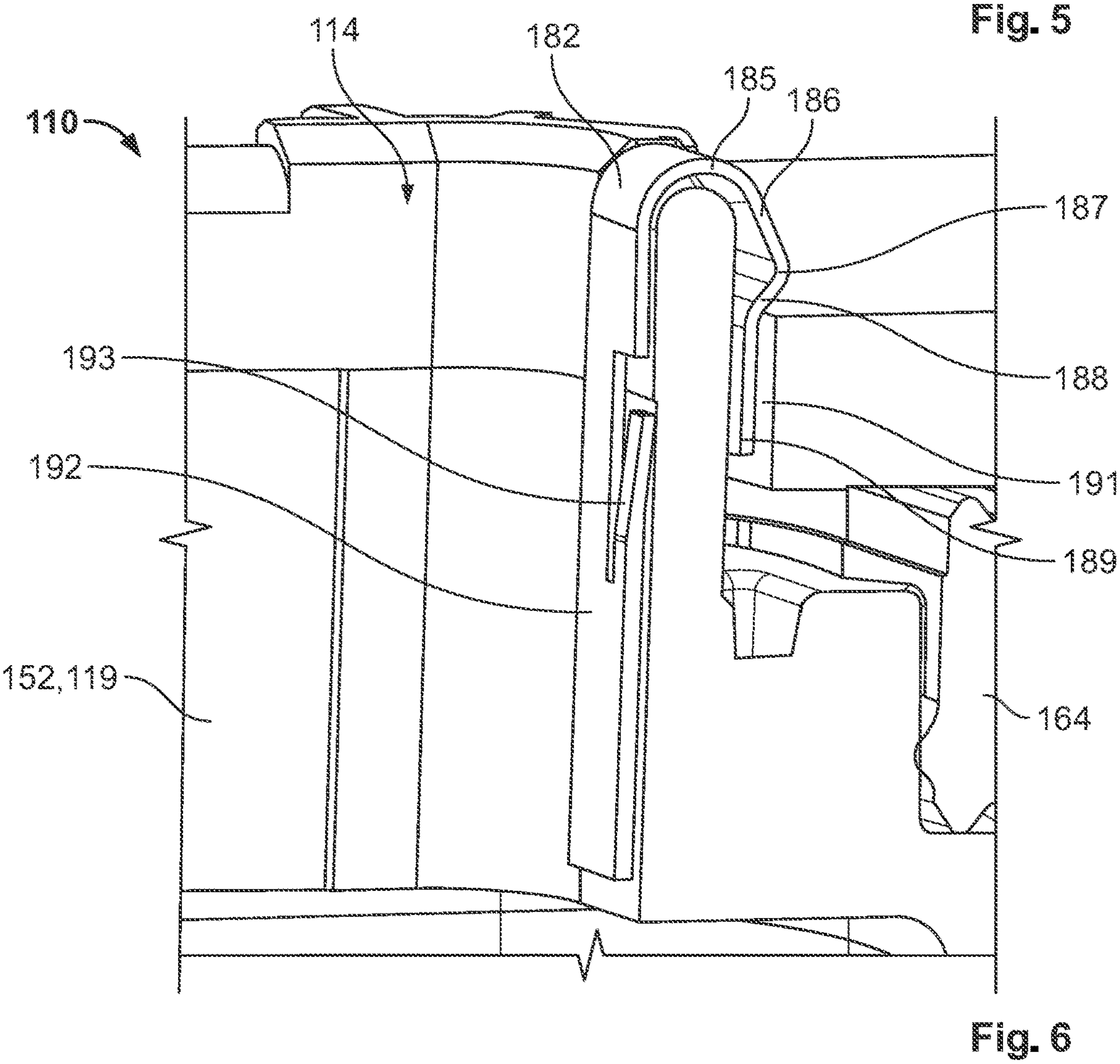
FIG. 6 is a partially side cross-sectional view of the header of FIG. 1 implementing a locking feature according to another embodiment of the present disclosure.

Still referring to FIGS. 4-6, each of the elastic locking features 181, 182 includes a first leg having a base 185, a lead-in portion 186, a lead-out portion 188, and a free end 189. A vertex 187 is defined between the lead-in and lead-out portions 186, 188, and defines the most radially-outward portion of the elastic locking features 181, 182. The lead-in portion 186 extends obliquely outward from the base 185 relative to an insertion direction of the header 110 into the mounting wall 195 or device. The lead-out portion 188 extends obliquely inward from the lead-in portion 186 relative to the insertion direction. The free end 189 extends in a direction generally toward the base 112, and parallel to an insertion direction of the header 110.

During an insertion operation of the header 110, the ramped lead-in portion 186 contacts an outer surface 196 of the mounting wall 195. The lead-in portion 186 is then biased elastically radially-inward by an interior wall 191 of the opening formed through the mounting wall 195, until the header 110 reaches the installed position shown in the figures. Likewise, during removal of the header 110, the ramped lead-out portion 188 contacts an inner or underside surface 197 of the mounting wall 195, biasing it elastically radially-inward and permitting removal of the header without manually releasing the locking element via, for example, a tool. The lead-in and lead-out portions 186, 188 at least partially oppose the mounting wall 195 during respective insertion and removal operations. Notably, with the header 110 in the installed position as shown in the figures, the free end 189 of the first leg 184 is engaged with, or extends into, the opening formed in the mounting wall 195 (i.e., is directly adjacent to the interior wall 191). In this way, the free end 189 cannot interfere with the motion of the header 110 as it is removed from the mounting wall 195.

As set forth above, in the embodiment of FIGS. 4 and 5, the base 185 of the elastic locking element 181 integrally connects to, or is formed with, a remaining portion of the shield 119. The circumferential wall 152 defining the second plug end is arranged between the shield 119 and the remainder of the locking element or tab 181. In the embodiment of FIG. 6, the elastic element is formed as a discrete spring or elastic clip 182. Specifically, in addition to the features as set forth above (e.g., a first leg having lead-in and lead-out portions 186, 188), the clip 182 further comprises a second leg 192 connected to the base 185. In the installed position shown, the second leg 192 extends in a direction opposite the insertion direction, with a free end thereof arranged within the opening 114 in the header 110 and abutting against an interior surface of the circumferential wall 152 or the shield 119.

Still referring to FIG. 6, the second leg 192 further defines a retention protrusion or arm 193 engaging with the circumferential wall 152 of the second plug end or the shield 119, and fixing the elastic clip 182 in an installed position on the header 110. The retention arm 193 includes a free end extending at least partially in the insertion direction of the header 110 and obliquely with respect to a remainder of the second leg 192, the circumferential wall 152 and/or the shield 119. In one embodiment, the free end of the retention arm 193 may be sharpened for improving the fixation of the elastic clip 182. In other embodiments, the shield 119 may also implement integral retention arms, similar to those shown in FIG. 6, for securing the shield to the second plug end, or to the interior of the circumferential wall 152.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. An electrical header for mounting to an object, comprising:

a body including a base, a first end defined on a first side of the base and adapted to mate with a mating connector, and a second end defined on a second side of the base and adapted to be inserted into an opening formed in the object in an insertion direction; and an elastic locking element arranged on the second end of the body and adapted to secure the header within the opening of the object, the elastic locking element sized and shaped to be elastically biased by the object in a direction transverse to an insertion direction of the header during removal of the header from the opening, the elastic locking element includes a first leg, having:

a base arranged proximate the second end of the body:

a lead-in portion extending obliquely outward from the base relative to the insertion direction of the header into the opening of the object;

a lead-out portion extending obliquely inward from the lead-in portion relative to the insertion direction; and a free end extending from the lead-out portion in a direction toward the base.

2. The electrical header of claim 1, wherein the free end of the first leg extends parallel to the insertion direction.

3. The electrical header of claim 1, wherein the lead-in portion is arranged proximate to the second end of the body opposite the base, the lead-out portion declining in a direction toward the base.

4. The electrical header of claim 1, wherein the elastic locking element comprises an elastic clip, the first leg and a second leg of the elastic clip receiving a portion of the second end of the body therebetween, the second leg connected to the base of the first leg.

5. The electrical header of claim 4, wherein the second leg further includes a retention protrusion engaging with an internal sidewall of the second end of the body and fixing the elastic clip in an installed position on the header.

6. The electrical header of claim 5, wherein the retention protrusion defines a free end extending at least partially in the insertion direction of the header and obliquely with respect to a remainder of the second leg.

7. The electrical header of claim 1, further comprising a metallic shielding element extending through a terminal opening of the body, the elastic locking element formed integrally with the metallic shielding element.

8. The electrical header of claim 1, wherein the elastic locking element includes a first leg having a lead-in portion inclining away from a central axis of the header in the insertion direction, and a lead-out portion declining toward the central axis of the header in the insertion direction.

9. An electrical header for mounting to an object, comprising:

a body including a base, a first end defined on a first side of the base and adapted to mate with a mating connector, and a second end defined on a second side of the base and adapted to be inserted into an opening formed in the object in an insertion direction;

an elastic locking element arranged on the second end of the body and adapted to secure the header within the opening of the object, the elastic locking element sized and shaped to be elastically biased by the object in a direction transverse to an insertion direction of the header during removal of the header from the opening; and an electrical terminal arranged within an opening of the body and extending between the first end and the second end, wherein the electrical terminal is housed in a terminal assembly received within the opening of the body, the terminal assembly including:

a metallic shielding element extending through the opening of the body, the elastic locking element formed integrally on an end of the metallic shielding element; and an insulating body arranged within the metallic shielding element and receiving the electrical terminal.

10. The electrical header of claim 9, wherein the elastic locking element includes a first leg having a lead-in portion inclining away from a central axis of the header in the insertion direction, and a lead-out portion declining toward the central axis of the header in the insertion direction.

11. An electrical header assembly, comprising:

an electrical device having a mounting wall defining an opening; and a header, including:

a base attached to the mounting wall;

a first plug end defined on a first side of the base and adapted to mate with a mating connector; and a second plug end defined on a second side of the base and inserted into the opening of the device in an insertion direction; and an elastic locking element arranged on the second plug end and elastically engaging with the mounting wall as the header is inserted into the opening, the elastic locking element elastically biased by the opening of the device in a direction transverse to the insertion direction as the header is removed from the opening, the elastic locking element including a first leg having:

a lead-in portion at least partially opposing a first surface of the mounting wall in the insertion direction;

a lead-out portion at least partially opposing a second surface of the mounting wall in a direction opposite the insertion direction; and a free end extending from the lead-out portion in a direction toward the base, the free end extending at least partially into the opening in the mounting wall with the header in an installed position on the device.

12. The electrical header assembly of claim 11, wherein the lead-in portion inclines in a direction away from a central axis of the header in the insertion direction, and the lead-out portion declines in a direction toward the central axis of the header in the insertion direction.

13. The electrical header assembly of claim 11, further comprising a second leg attached to the first leg, the second plug end received between the first leg and the second leg for attaching the elastic locking element to the header.

14. The electrical header assembly of claim 11, wherein the header further includes an electrical terminal assembly extending between the first plug end and the second plug end through an opening formed in the header, the electrical terminal assembly including:

at least one electrical terminal;

a metallic shielding element, the elastic locking element formed integrally on an end of the metallic shielding element; and an insulating body arranged within the metallic shielding element and receiving the at least one electrical terminal.

15. The electrical header assembly of claim 11, wherein the elastic locking element includes a first leg having a lead-in portion inclining away from a central axis of the header in the insertion direction, and a lead-out portion declining toward the central axis of the header in the insertion direction.

16. The electrical header assembly of claim 11, wherein the elastic locking element is fixed to a circumferential wall defining the second plug end.

17. An electrical header for mounting to an object, comprising:

a body including a base, a first end defined on a first side of the base and adapted to mate with a mating connector, and a second end defined on a second side of the base and adapted to be inserted into an opening formed in the object in an insertion direction; and an elastic locking clip arranged on the second end of the body and adapted to secure the header within the opening of the object, the elastic locking clip sized and shaped to be elastically biased by the object in a direction transverse to an insertion direction of the header during removal of the header from the opening, the elastic locking clip including:

a first leg having a base arranged proximate the second end of the body; and a second leg, the first leg and the second leg receiving a portion of the second end of the body therebetween, the second leg connected to the base of the first leg.

18. The electrical header of claim 17, wherein the second leg includes a retention protrusion engaging with an internal sidewall of the second end of the body and fixing the elastic locking clip in an installed position on the header.

19. The electrical header of claim 18, wherein the retention protrusion defines a free end extending at least partially in the insertion direction of the header and obliquely with respect to a remainder of the second leg.

20. The electrical header of claim 17, wherein the first leg of the elastic locking clip further includes:

a lead-in portion extending outward from the base relative to the insertion direction of the header into the opening of the object;

a lead-out portion extending inward from the lead-in portion relative to the insertion direction; and a free end extending from the lead-out portion in a direction toward the base.

* * * * *